United States Patent [19]

Wood et al.

[11] 4,236,648
[45] Dec. 2, 1980

[54] SAFETY PRESSURE RELIEF APPARATUS

[75] Inventors: Loren E. Wood; Calvin C. Forsythe, both of Tulsa; John L. Strelow, Broken Arrow; Edward H. Short, III; Jerome D. Allen, both of Tulsa; Miner E. Clift, Broken Arrow, all of Okla.

[73] Assignee: Black, Sivalls & Bryson, Houston, Tex.

[21] Appl. No.: 17,198

[22] Filed: Mar. 5, 1979

[51] Int. Cl.³ .............................................. B65D 25/00
[52] U.S. Cl. ................................................. 220/89 A
[58] Field of Search ................. 220/89 A, 367; 222/5, 222/80, 396, 397

[56] References Cited

U.S. PATENT DOCUMENTS

| | | | |
|---|---|---|---|
| 2,095,828 | 10/1937 | Nerad | 220/89 A |
| 2,336,490 | 12/1943 | Vico | 220/89 A |
| 3,294,277 | 12/1966 | Wood | 220/89 A |
| 3,484,817 | 12/1969 | Wood | 220/89 A |

Primary Examiner—Steven M. Pollard
Attorney, Agent, or Firm—Laney, Dougherty, Hessin & Beavers

[57] ABSTRACT

The present invention relates to a safety pressure relief apparatus comprised of a reverse buckling rupture disk having a concave-convex portion connected to an annular flat flange portion by a curved transition connection and a support member having an annular flat flange portion for engaging the annular flat flange portion of the rupture disk and for supporting the transition connection thereof. The support member includes a partially circular cutting edge positioned interiorly of the transition connection and forming, in conjunction with a non-cutting interior edge, an opening in the support member so that when the concave-convex portion of the rupture disk reverses itself, the cutting edge partially severs the disk whereby a portion thereof bends about an unsevered hinge portion and passes through the opening in the support member. The hinge portion of the rupture disk is supported by the non-cutting interior edge of the support member. An improved serrated cutting edge is included having rounded notches between adjacent teeth thereby providing a cutting edge with fewer stronger teeth extending a shorter distance so that the available flow area through the opening in the support member is increased.

22 Claims, 11 Drawing Figures

SAFETY PRESSURE RELIEF APPARATUS

BACKGROUND OF THE INVENTION

1. Field of the Invention

This invention relates generally to safety pressure relief apparatus, and more particularly, but not by way of limitation, to a safety pressure relief apparatus which includes a reverse buckling rupture disk.

2. Description of the Prior Art

A variety of safety pressure relief apparatus of the rupture disk type have been developed. Generally these devices include a rupture disk supported between a pair of complementary supporting members of flanges which are in turn connected to a relief connection in a vessel or system containing fluid pressure. When the fluid pressure within the vessel or system exceeds the design rupture pressure of the disk, rupture occurs causing fluid pressure to be relieved from the vessel or system.

In recent years, rupture disk assemblies of the "reverse buckling" type have been developed which are capable of operating at 90 percent or more of the pressure at which the disk is designed to rupture. Such assemblies generally include a rupture disk having a concave-convex portion connected to an annular flat flange portion by a curved transition connection and a pair of annular supporting members between which the annular flat flange portion of the rupture disk is clamped. The rupture disk is positioned in the assembly so that fluid pressure from the system or vessel to be protected is exerted on the convex side of the disk. This results in the disk being placed in compression during operation and allows the normal fluid pressure exerted on the disk to be relatively close to the pressure at which the disk is designed to rupture.

In order to open the disk and to prevent the formation of loose pieces upon rupture, reverse buckling rupture disk assemblies have heretofore included knife blades upon which the disk impales when reversed by excess fluid pressure. One such knife blade assembly is described in U.S. Pat. No. 3,294,277 to Wood which is assigned to the assignee of this present invention. In addition, reverse buckling rupture disks have been developed and used which include scores or grooves on a surface of the concave-convex portion of the disk creating lines of weakness therein so that upon reversal, the concave-convex portion tears along the lines of weakness and opens without loose pieces being formed. Such a scored reverse buckling rupture disk is described in U.S. Pat. No. 3,484,817 to Wood, assigned to the assignee of this invention.

Rupture disks have also been developed using serrated cutting blades. Russian Pat. No. 396,515 to Malakhov et al. shows a concave-convex portion in combination with an X-shaped serrated cutting blade. U.S. Pat. No. 2,095,828 to Nerad shows a flat rupture disk and a circular serrated cutting member.

In the heretofore used reverse buckling rupture disk apparatus including knife blades, the knife blades are usually arranged so that upon reversal, the concave-convex portion of the rupture disk is cut into quarters or petals which are folded outwardly by the force of fluid under pressure flowing therethrough. Such knife blades are costly to manufacture and are usually positioned in a separate part of the rupture disk assembly making the entire assembly costly to manufacture. In addition, problems have been encountered in the operation of reverse buckling rupture disk assemblies including knife blades due to the knife blades becoming dull from corrosion and/or repeated usage and failing to sever the rupture disk upon reversal whereby pressure relief is not accomplished, or only partial severing of the rupture disk results whereby full opening is not achieved.

With the development and use of scored reverse buckling rupture disks, the problems associated with the use of knife blades were overcome. However, problems have also been encountered in the use of scored reverse buckling rupture disks in that such disks at low design pressures sometimes reverse erratically whereby full opening is not achieved or reverse without rupturing. Also, if such disks are damaged, i.e., accidentally deformed, during handling or installation, reversal without rupture can occur. Unless the disks are manufactured in a manner whereby the ratio of tension rupture pressure to design reversal rupture pressure is low, the fluid pressure required to rupture the disks in tension after reversal without rupture can exceed the design reversal rupture pressure of the disks by a considerable amount creating an extremely dangerous over-pressure condition in the vessels or system intended to be protected.

The term "tension rupture pressure" is used herein to mean the fluid pressure exerted on the concave-convex portion of a reverse buckling rupture disk required to cause the rupture thereof after the concave-convex portion has reversed but not ruptured due to damage or other reason. The term "design reversal rupture pressure" is used herein to mean the fluid pressure exerted on the convex side of a reverse buckling rupture disk at which the concave-convex portion thereof is designed to (and does under normal conditions) reverse itself and rupture.

Since under applicable pressure vessel and pipe codes, the test pressure of pressure vessels and systems is set at 1.5 times the design pressure of such vessels and systems, it is desirable that reverse buckling rupture disks have a design reversal rupture pressure at or below the design pressure of the vessel or system to be protected and a tension rupture pressure no higher than 1.5 times the design reversal rupture pressure. This insures that if such disks reverse without rupturing, rupture will ultimately occur before the pressure level within the vessel or system exceeds the test pressure thereof.

This ratio of tension rupture pressure to design reversal rupture pressure is referred to herein by the term "damage ratio". This term is derived from the fact that reversal without rupture is generally the result of the rupture disk being damaged during handling or installation. The damage ratio is therefore the ratio of the pressure at which a damaged disk will rupture to the pressure at which an undamaged disk will rupture.

In applications for scored reverse buckling rupture disks wherein the design reversal rupture pressure is in a normal pressure range, i.e., above about 125 psig in 1 inch size to above about 40 psig for 6 inch size, scored reverse buckling rupture disks have been developed and used successfully wherein the damage ratio is 1.5 or less. However, in low pressure applications, the disks are difficult to manufacture and the damage ratio is more difficult to control resulting in a possibility that the test pressure of the vessel or system being protected will be exceeded before rupture occurs, and because of the low fluid pressure, reversal of a scored reverse buckling rupture disk can more readily take place without sufficient force being exerted on the disk after reversal to cause it to fully tear along the lines of weakness created by the scores thereon resulting in only partial opening. Thus, the use of scored reverse buckling rupture disks has been limited to applications wherein the design reversal rupture pressures thereof are within the normal pressure range mentioned above.

In most reverse buckling rupture disk apparatus developed and used heretofore, problems have been encountered which result from uncontrolled reversal of the disks. That is, nearly all of the reverse buckling rupture disks utilized heretofore include a concave-convex portion connected to an annular flat flange portion by a curved transition connection. With the exception of certain designs which reverse from the center portion outwardly, e.g., scored reverse buckling rupture disks and others including weakened center portions, when excess fluid pressure is exerted on such disks, the reversal process starts at the transition connection. That is, the transition connection is moved inwardly toward the center of the disk at a point thereon having the least resistance followed by the reversal of the entire concave-convex portion of the disk. Heretofore, the particular point along the transition connection at which the reversal starts has been left to chance, sometimes resulting in less than desirable operational results. That problem is avoided in the present invention by providing a portion of said transition connection with a greater radius of curvature so that reversal will initiate at that portion of greater radius of curvature.

By the present invention, a safety pressure relief apparatus of the reverse buckling rupture disk type is provided which is economical to manufacture and which includes a knife blade for partially severing the disk upon reversal, but which obviates the problems relating to knife blades mentioned above. Further, the apparatus of the present invention achieves full opening in extremely low pressure applications while maintaining a damage ratio of 1.5 or less. Also, the reversal process of the rupture disk of this invention is controlled in a manner whereby the partially severed portion of the rupture disk formed upon reversal is retained and prevented from being moved downstream with the fluid being relieved.

A safety pressure relief apparatus somewhat similar to that of the present invention is disclosed in U.S. patent application Ser. No. 832,417 to Witten et al., assigned to the assignee of the present invention. Witten et al. discloses a completely circular cutting edge which completely severs a substantially circular portion of the rupture disk, which severed portion is then caught on a curved catcher portion spaced downstream from the cutting edge.

The present invention provides a preferable alternative to Witten et al., in that the rupture disk is only partially severed and is retained by an integral hinge portion of the rupture disk, thereby eliminating the possibility that the severed portion might miss the catcher bar and be transported downstream by the escaping fluid.

An additional improvement provided by the present invention is the rounded notches between adjacent teeth of the serrated cutting edge. Using a preferred extension of the rounded notch concept, the teeth may be formed by cutting overlapping circular portions from the support member so that the teeth are defined by intersecting circular arc notches. These rounded notch designs permit the use of fewer larger teeth which extend a shorter radially inward distance. These shorter larger teeth are also stronger and less easily deformed. The use of shorter teeth increases the flow area of the opening of the support member and also causes the rupture disk to be severed at relatively lower pressures, since there is a greater stress concentration at the point of each tooth for a given differential.

SUMMARY OF THE INVENTION

The present invention relates to a safety pressure relief apparatus comprised of a reverse buckling rupture disk having a concave-convex portion connected to an annular flat flange portion by a curved transition connection and a support member having an annular flat flange portion for engaging the annular flat flange portion of the rupture disk and for supporting the transition connection thereof. The support member includes a partially circular cutting edge positioned interiorly of the transition connection and forming, in conjunction with a non-cutting interior edge, an opening in the support member so that when the concave-convex portion of the rupture disk reverses itself, the cutting edge partially severs the disk whereby a portion thereof bends about an unsevered hinge portion and passes through the opening in the support member. The hinge portion of the rupture disk is supported by the non-cutting interior edge of the support member. An improved serrated cutting edge is included having rounded notches between adjacent teeth thereby providing a cutting edge with fewer teeth extending a shorter distance so that the available flow area through the opening in the support member is increased.

It is, therefore, an object of the present invention to provide a safety pressure relief apparatus of the reverse buckling rupture disk type including a knife blade for partially severing the disk upon reversal which is economical to manufacture.

A further object of the present invention is the provision of a reverse buckling rupture disk assembly including a knife blade which after rupture can economically be discarded and replaced with an entirely new assembly.

Yet a further object of the present invention is the provision of a safety pressure relief apparatus of the reverse buckling rupture disk type which achieves full opening in extremely low pressure applications while still maintaining a damage ratio of 1.5 or less.

Another object of the present invention is the provision of a safety pressure relief apparatus which includes a reverse buckling rupture disk wherein the direction of reversal upon failure is controlled.

Yet another object of the present invention is the provision of a safety pressure relief apparatus wherein a partially severed section of the disk, formed upon reversal and rupture, is retained by an integral hinge portion of the disk.

And another object of the present invention is the provision of an improved serrated cutting edge having rounded notches between the teeth thereof permitting the use of fewer shorter teeth, thereby increasing the available flow area through the opening in the support member and decreasing the pressure required for severance of the rupture disk.

A further object of the present invention is to provide a circular arc form of rounded notch, whereby adjacent circular arc rounded notches intersect at a point of a tooth, and to provide a method of manufacturing the same.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Referring now to the drawings and particularly to FIGS. 1-3 and 7, one form of the safety pressure relief apparatus of the present invention is illustrated and generally designated by the numeral 10. The apparatus 10 is comprised of a reverse buckling rupture disk 12 having a concave-convex portion 14 connected to an annular flat flange portion 16 by a curved transition connection 18.

Figures 1, 2:
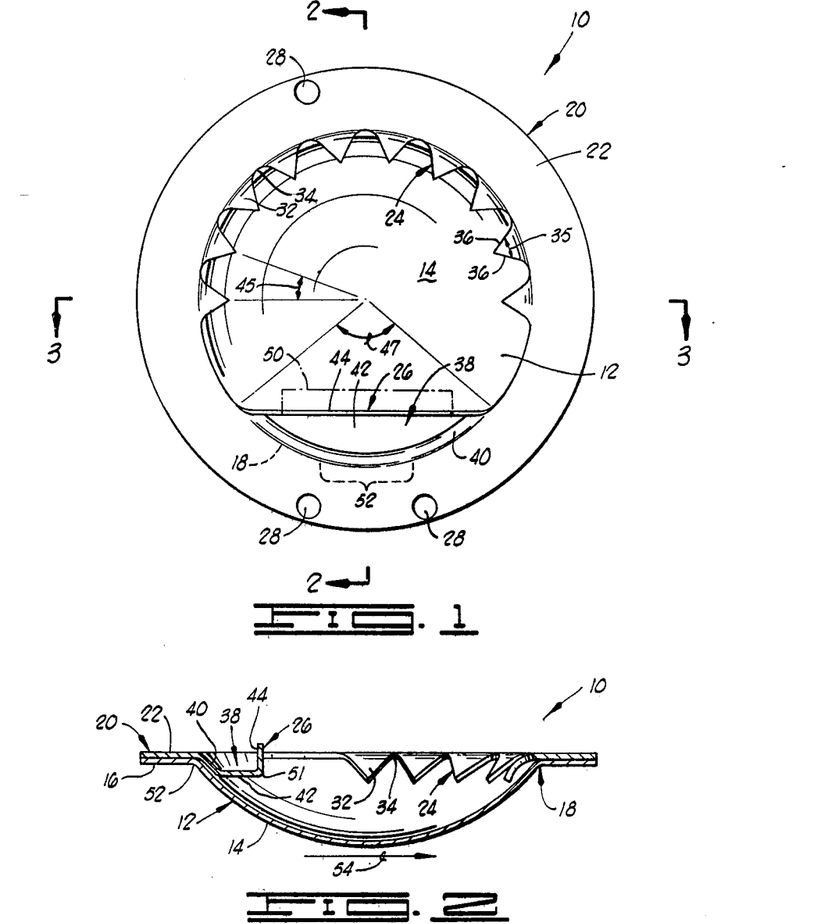
FIG. 1 is a bottom plan view of the safety relief apparatus of the present invention.
FIG. 2 is a sectional elevation view along lines 2—2 of FIG. 1.

The annular flat flange portion 16 of the rupture disk 12 is attached to a thin support member 20 which can be economically formed of sheet metal or the like. The support member 20 has an annular flat flange portion 22, a partially circular serrated cutting edge 24 and a non-cutting interior edge 26.

The annular flat flange portion 22 of the support member 20 is of a size corresponding to the size of the annular flat flange portion 16 of the rupture disk 12, and in a preferred embodiment, the flange portions of the rupture disk and support member are rigidly attached together by a plurality of spot welds 28.

Figure 3:
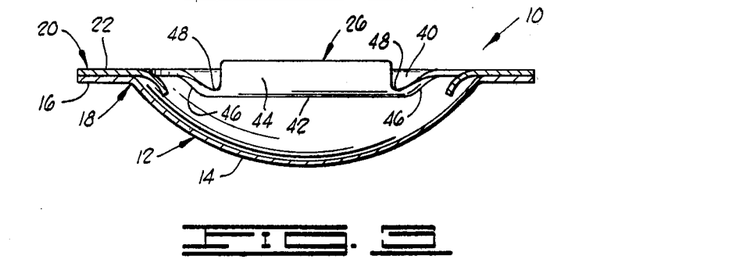
FIG. 3 is a sectional elevation view along lines 3—3 of FIG. 1.

As best shown in FIGS. 2 and 3, the partially circular serrated cutting edge 24 of the support member 20 is positioned interiorly of the transition connection 18 of the rupture disk 12 whereby the transition connection is supported by the annular flat flange portion 22 of the support member 20. Further, the serrations of the cutting edge 24 are formed in the shape of triangle-shaped teeth 32 with rounded notches 34 therebetween. These teeth 32 are inclined toward and into the concave-convex portion 14 of the rupture disk 12 at an angle in the range of from about 30° to about 45° from the plane of the flange portion 22.

Several factors contribute to the desirability of the rounded notches 34 between adjacent teeth 32, particularly in the relatively low pressure applications for which the present invention is intended. For a given thickness, material and geometry of the rupture disk 12, the pressure differential required to cause the teeth 32 to initially penetrate the rupture disk 12 is proportional to the number of teeth contacting the rupture disk, because the fewer teeth present, the larger the force exerted on each tooth.

Also of some importance is the tooth point angle 35 defined by the two edges 36 of each tooth. The smaller the tooth point angle 35, the more easily the tooth 32 will penetrate the rupture disk 12. However, with the triangular shape tooth 32 and rounded notches 34 shown in FIG. 1, the smaller the tooth point angle 35 is, the more teeth 32 are required. It has been determined that when using the triangular shaped teeth of FIG. 1, a preferred angle 35 between sides 36 of each tooth 32 is in the range of about 50° to 70° and preferably is approximately 60°. This provides a satisfactory compromise between the desire for narrow teeth and the desire for a small number of teeth.

Also, it is desirable that the teeth 32 be as short as possible. This is because of the desirability of having structurally strong teeth as well as having as large an opening as possible for the relieved fluids to pass through.

Finally, it is necessary that the portion of the cutting edge between adjacent teeth 32, i.e., the notches 34, be of such a shape that the rupture disk 12 will be severed when it contacts that portion.

It has been discovered that a particular shape of notch, namely the rounded notch 34 disclosed herein, complements all of these desirable factors and is a great improvement over the sharp notch previously used, as for example in U.S. patent application Ser. No. 832,417 of Witten, et al.

Figure 10:
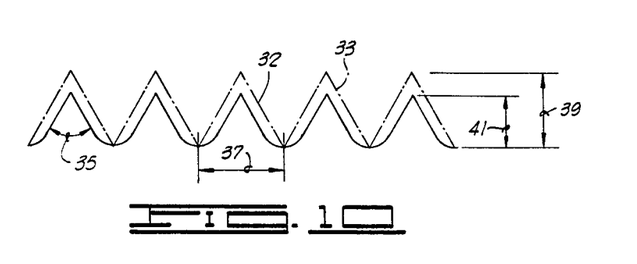
FIG. 10 is a schematic comparison of the improved rounded notch teeth of the cutting edge of the present invention to previously used sharp notch teeth.

FIG. 10 shows a schematic comparison of the improved teeth 32 of the present invention as compared to sharp notch teeth 33 (shown in phantom lines). For a given tooth spacing 37, and for a given angle 35 at the point of the tooth, the height 39 of a sharp notch tooth 33 is greater than the height 41 of the rounded notch tooth 32.

The shorter rounded notch teeth 32 of the present invention are structurally stronger than the sharp notch teeth of the prior art and provide an increased flow area through the opening of support member 20 while retaining the same tooth point angle and tooth spacing of the longer sharp notched teeth 33.

Conversely, for a given flow area, a cutting edge constructed of rounded notch teeth, rather than sharp notch teeth of the same tooth point angle, requires fewer teeth. As discussed above, for fewer teeth the pressure differential required to sever a damaged rupture disk which initially reversed without rupture is lowered. This improves (lowers) the damage ratio thereby providing a more safe design than the sharp notched tooth design.

In a nominal 3 inch diameter rupture disk embodying the cutting edge 24 of FIG. 1, the notches have a radius of about 0.125 inch for a support member with ten rounded notch teeth with a 60° tooth point angle, and a 21° angular spacing 45 between teeth on a 2.675 inch I.D. at the tooth points and a 3.23 inch I.D. at the tooth roots, i.e. on the rounded notches 34. An included angle 47 of the non-cutting edge 26 is in the range of about 100° to 108°, and preferably is about 105°. This provides for a wide enough hinge portion 56 (see FIG. 7) to prevent hinge portion 56 from tearing, and at the same time does not drastically restrict the area of the inner opening available for fluid flow.

Figure 11:
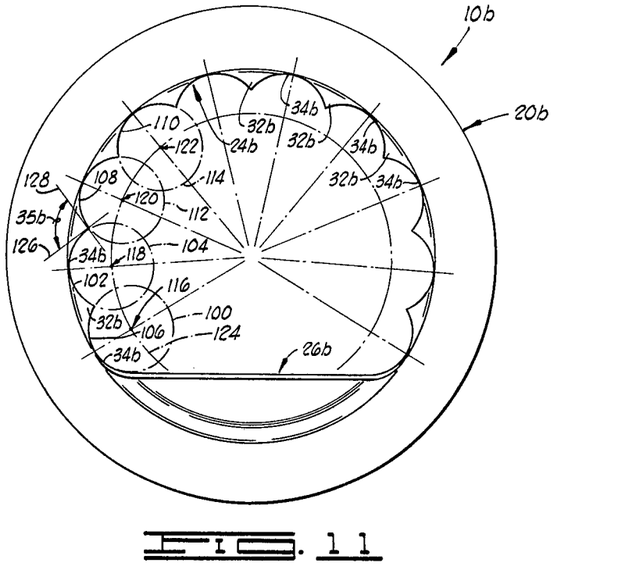
FIG. 11 is a bottom plan view, similar to FIG. 1, illustrating the circular arc form of rounded notch and the method of manufacturing the same.

In an alternative embodiment of the present invention, the rounded notch concept is extended to that of the safety pressure relief apparatus 10b illustrated in FIG. 11. There the teeth 32b are no longer triangular, but rather are defined by a remaining portion of material left when overlapping circular portions are removed from support member 20b to form the serrated cutting edge 24b. The notches 34b each comprise an arc of a circle extending from a point of one tooth 32b to the point of an adjacent tooth 32b.

The support member 20b, which may also be referred to as a knife means 20b since it includes cutting edge 24b, is manufactured in the following manner.

The circular arc notches 34b are cut in a thin metal sheet from which the support member 20b is to be formed. Notches 34b are preferably cut by means of a circular punch. The notches 34b are punched toward the side of support member 20b which will be placed adjacent rupture disk 12. This is because the punching operation forms a sharp burr on that side where the punch exits the metal sheet. This sharp burr aids in cutting the rupture disk 12 when it reverses.

The punch is used to cut a series of overlapping holes to form the partially circular serrated cutting edge 24 as follows. A first circular portion of material 100 is cut from the interior of the metal sheet. Then a second portion of material is cut from the sheet, said second portion including an arc 102 of a second circle 104. First and second circles 100 and 104 overlap so that arc 102 of second circle 104 intersects an arc 106 of first circle 100 to define a tooth 32b of knife means 20b. The arcs 102 and 106 are, of course, also notches 34b.

A plurality of additional portions of material are then punched from the metal sheet, said additional portions each including an arc of an additional circle, such as arcs 108 and 110 of additional circles 112 and 114, respectively. Each of the first, second, and additional circles 100, 104, 112 and 114 have centers 116, 118, 120 and 122, respectively, lying on another circle 124, so that serrated cutting edge 24b is at least partially circular in configuration.

The teeth 32b are then bent so as to be inclined at an angle to the plane of the metal sheet from which knife means 20b is formed.

It will be appreciated that the rounded notch 34, and more particularly the circular arc form of rounded notch 34b, and the methods of manufacturing the same, are applicable to safety pressure relief devices other than the ones disclosed herein. For example, the rounded notches are applicable to a safety pressure relief device having a completely circular serrated cutting edge, such as the one disclosed in U.S. patent application Ser. No. 832,417 to Witten, et al., assigned to the assignee of the present invention.

The dimensions of the various features of the cutting edge 24 and non-cutting edge 26 of the safety pressure relief devices of the present invention of course vary with the nominal size of the apparatus 10. Dimensions which have been determined to be appropriate for various nominal sizes are given in the following table. The nominal sizes up to and including 4" are based upon the embodiment of FIG. 1 with triangular teeth, while the larger sizes are based upon the circular arc rounded notch design of FIG. 11. Either embodiment, i.e., FIG. 1 or FIG. 11, may of course be used with both the smaller and larger sizes.

| Nominal Disk Diameter (inches) | Approximate Tooth Point Angle 35 (Degrees) | Radius of Rounded Notch 34 or 34b (inches) | Angular Spacing 45 Between Teeth (Degrees) | No. of Teeth | Approximate Included Angle 47 of Non-cutting Edge (Degrees) |
|---|---|---|---|---|---|
| 1 | 60 | 1/16 | 28 | 7 | 105 |
| 1½ | 60 | ⅛ | 31.5 | 6 | 105 |
| 2 | 60 | ⅛ | 25.2 | 8 | 105 |
| 3 | 60 | ⅛ | 21 | 10 | 105 |
| 4 | 60 | ⅛ | 15.75 | 12 | 105 |
| 6 | 90+ | ¾ | 27.45 | 9 | 105 |
| 8 | 90− | ¾ | 20.5 | 12 | 105 |
| 10 | Not available | 1 | Not available | Not available | 105 |
| 12 | 102 | 1 | 14.5 | 16 | 105 |

With the designs shown in the table for the larger nominal diameters using the circular arc type of rounded notches of FIG. 11, damage ratios of 1.0 or even lower are achieved. This is because of the decrease in the number of teeth present because of the circular arc notch.

The tooth point angle 35b of the design of FIG. 11 is measured between tangent lines 126 and 128 of circles 104 and 112, respectively, at the intersection of arcs 102 and 108 at the point of the tooth therebetween. The tooth point angle 35b is preferably in the range of about 90° to 105°.

An additional benefit of the circular arc notch design of FIG. 11 is that it provides a shorter and stronger shape of tooth 32b than even does the triangle tooth and rounded notch design of FIG. 1. This stronger tooth shape allows the support member 20b to be made from a thinner sheet of metal than it could using other designs, thereby decreasing the cost of the apparatus 10b.

The non-cutting interior edge 26, of support member 20, comprises a chord of the circle partially defined by serrated cutting edge 24. The non-cutting edge 26 is defined by an integral channel shaped portion 38 having a sloped arcuate side portion 40, a flat bottom portion 42, and a substantially vertical straight side portion 44. It is the vertical side portion 44 which comprises a chord of the circle partially defined by the serrated cutting edge 24.

As seen in FIG. 2, the sloped arcuate side portion 40 is inclined toward and into the concave-convex portion 14 of the rupture disk 12 at approximately the same angle as are the teeth 32. The sloped side portion 40 prevents the area around curved transition connection 18, adjacent sloped side portion 40, from undergoing severe deformation when disk 12 reverses and ruptures. This decreases the stress in the area of hinge portion 56, thus tending to prevent hinge portion 56, from tearing.

Also of importance is the fact that the entire channel portion 38 extends from the plane of flange portion 22 toward rupture disk 12. This too decreases the deformation of hinge portion 56. When rupture disk 12 reverses, hinge portion 56 "wrinkles" because it has an area greater than the area of the surface of channel portion 38 against which it is pushed by the escaping fluid. If channel portion 38 were replaced with a flat chordal section in the same plane as flange portion 22, the deformation of hinge portion 56 would be even greater and would increase the chance of its being torn away.

Although, in some applications a flat chordal section forming non-cutting edge 26 might be acceptable, and indeed it would be possible to merely eliminate a number of teeth from a serrated circular opening, it is preferrable to use a channel shaped portion 38 as shown.

As best seen in FIG. 3, the vertical side portion 44 has sloped ends 46 defined by the intersection of the vertical side 44 with the sloped arcuate side 40. The vertical side portion 44 extends a distance above and a distance below the plane of the annular flat flange portion 22 of support member 20. Notches 48 are located just inside either end 46 of the vertical side 44.

Prior to stamping of the channel shaped portion 38, the support member 20 is comprised of an annular flat plate with a flat chordal portion having a radially inwardly extending flat lip as shown in phantom lines at 50 of FIG. 1. When the channel shaped portion 38 is stamped into the flat plate of support member 20 the vertical side wall 44 is formed by bending the flat lip 50 upward. The deformation of the sheet metal of the support member 20 causes the corners adjacent lip 50 to be transformed into notches 48.

This channel shaped portion 38 then serves as a structural support for the rupture disk 12 when it reverses itself and bends about the non-cutting edge 26 defined by the vertical side wall 44. This channel shaped portion 38 is relatively much stronger than would be a flat sheet metal chordal section. Also, the corner 51 at the junction of vertical side 44 with bottom portion 42 is smooth and rounded as opposed to the rough sharp edge which might be presented by a flat sheet metal chordal section. This smooth rounded corner 51 engages the disk 12 upon reversal.

As shown in dashed lines in FIG. 1, a portion 52 of the curved transition connection 18 of the rupture disk 12 is formed of a substantially greater radius of curvature than the remaining portion of the transition connection 18. As mentioned above, in operation, the reverse buckling rupture disk 12 is in compression, i.e., the forces exerted on the disk by fluid under pressure are transmitted to the convex side of the concave-convex portion 14 placing the concave-convex portion in compression. The compressive forces are transmitted by way of the curved transition connection 18 to the annular flat flange portion 22 of the support member 20 supporting the transition connection 18.

Generally, for a particular thickness of the rupture disk 12, the smaller the radius of curvature of the transition connection 18, the more resistance the rupture disk 12 has to reversal. That is, when the forces exerted on the disk 12 exceed the disk's ability to resist reversal, the transition connection 18 moves or rolls inwardly at the point thereon of the greatest radius of curvature, followed by the reversal of the entire concave-convex portion 14 thereof. By producing the disk 12 with the portion 52 of the transition connection 18 having a substantially greater radius of curvature than the remaining portion of the transition connection 18, the reversal process starts at the point 52 and proceeds in a direction substantially transverse to the portion 52.

The portion 52 of enlarged radius of curvature of the transition connection 18 is positioned adjacent the channel shaped portion 38 of support member 20. As shown in FIG. 2, when the fluid pressure exerted on the convex side of the concave-convex portion 14 of the disk 12 reaches the level at which the concave-convex portion reverses itself, due to the larger radius of curvature of the portion 52 of the transition connection 18 and the consequent lesser resistance to inward roll of such portion, the reversal process begins at the portion 52 and progresses in a direction substantially transverse to the portion 52 as shown by the arrow 54.

Figure 7:
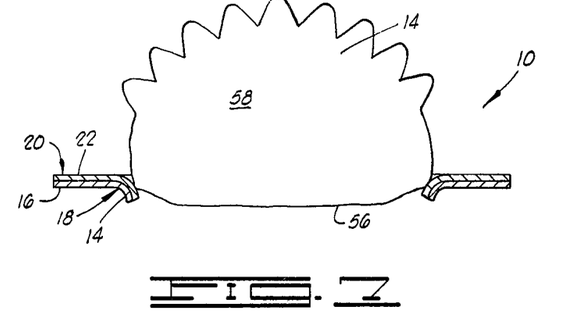
FIG. 7 is a sectional elevation view similar to that along lines 3—3 of FIG. 1, showing the rupture disk of FIG. 1 in the ruptured position.

The reversal process continues in the direction shown by the arrow 54 across the concave-convex portion 14 until the entire concave-convex portion 14 has reversed itself whereupon the part of the concave-convex portion 14 opposite the enlarged radius portion 52 of the transition connection 18 is severed by the cutting edge 24 of the support member 20. The severing of the portion 14 then continues in the direction opposite that of arrow 54 until the cut in the concave-convex portion 14 reaches the non-cutting interior edge 26, at which point the partially severed portion of the concave-convex portion 14 bends inwardly, about unsevered integral hinge portion 56, like the partially severed lid of a tin can, as shown in FIG. 7.

The unsevered integral hinge portion 56 of the concave-convex portion 14 retains the partially severed portion of the rupture disk 12 to prevent it from being carried downstream by the escaping fluids. The provision of the smooth rounded corner or edge 51 reduces the likelihood that a large pressure differential might sever the disk 12 at the hinge portion 56.

When the severance of the rupture disk 12 occurs in the manner just described, that is immediately subsequent to total reversal, the penetration of the disk by the teeth 32 is due to the high impact force achieved when the disk "snaps" into the reverse position thereby striking the teeth 32. This impact force is greatest at the point where reversal is completed, i.e., the point opposite the portion 52. If the direction of reversal were not controlled, but rather allowed to occur in a random manner, then the point of completion of reversal would sometimes lie on the non-cutting interior edge 26 and possibly allow the disk to reverse without rupture.

In a presently preferred embodiment of the invention, the transition connection 18 of the rupture disk 12 is formed whereby the radius of curvature of the portion 52 thereof is in the range of from about 1.5 to about 2 times greater than the radius of curvature of the remaining portion of the transition connection. The length of the portion 52 of the transition connection 18 varies with the particular size of rupture disk involved, but generally is in the range of from about ½ inch to about ¾ inch for rupture disks of 1 inch size, up to from about 1 inch to 1½ inches for rupture disks of 6 inch size and larger.

Thus, in operation of the apparatus 10, the entire apparatus is clamped between a pair of conventional pipe flanges or other clamping means which are in turn connected to a pressure relief connection of a vessel or system to be protected. The apparatus 10 is positioned so that the concave-convex portion 14 of the rupture disk 12 faces the upstream flange. When an over-pressure condition is reached in the vessel or system equal to or exceeding the design reversal rupture pressure of the disk 12, the concave-convex portion 14 thereof reverses itself and is partially severed by the cutting edge 24 of the support member 20, whereby a central section 58 thereof bends about the integral hinge portion 56 adjacent the non-cutting interior edge 26, and passes partially through the support member 20.

An alternative embodiment, 10a, of the present invention is illustrated in FIGS. 4–6 and 8, with like numerals indicating parts similar to those of FIGS. 1–3 and 7. The difference between safety apparatus 10a and safety apparatus 10 is that apparatus 10a comprises the addition of a cantilevered catcher bar 60, extending radially inward from non-cutting edge 26.

Figure 4:
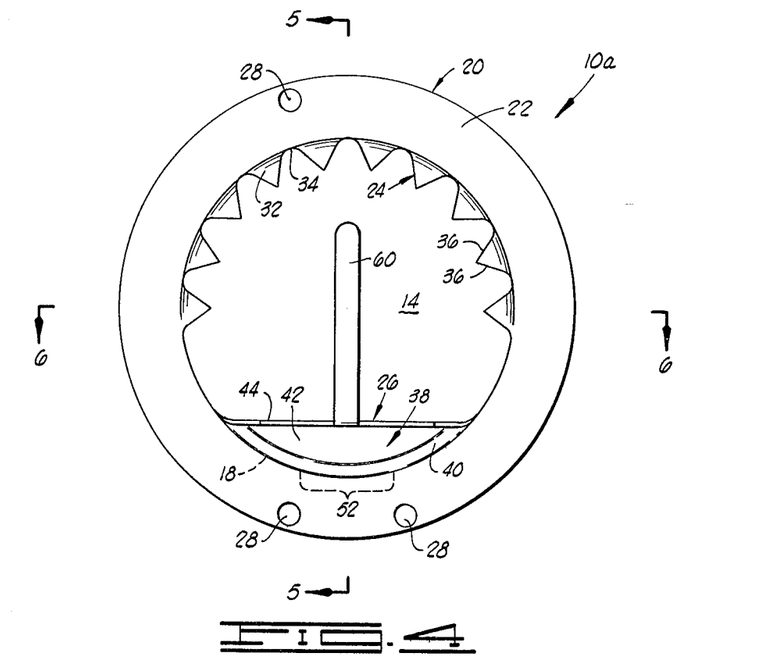
FIG. 4 is a bottom plan view of an alternative embodiment of the safety relief apparatus of the present invention, having an integral cantilevered catcher bar.
Figure 5:
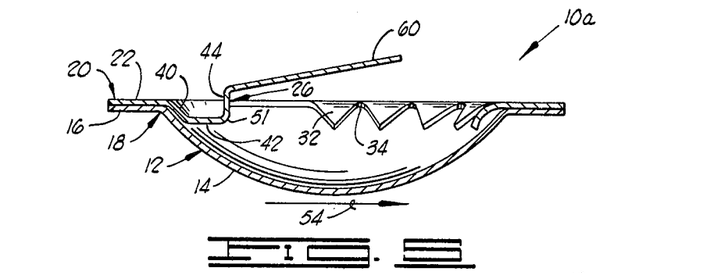
FIG. 5 is a sectional elevation view along lines 5—5 of FIG. 4.
Figure 6:
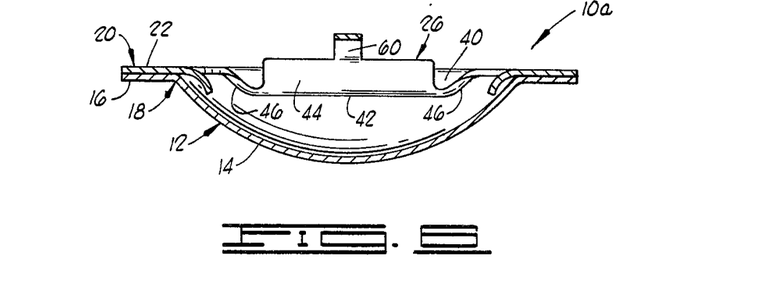
FIG. 6 is a sectional elevation view along lines 6—6 of FIG. 4.

Catcher bar 60 extends from vertical side portion 44 substantially perpendicular to side portion 44 and initially inclined at an acute angle to the plane of the annular flat flange portion 22 of support member 20.

Figure 8:
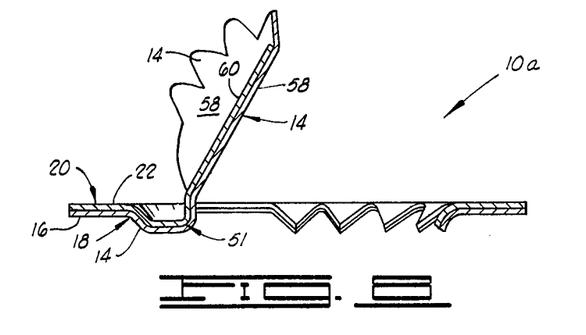
FIG. 8 is a sectional elevation view similar to that along lines 5—5 of FIG. 4, showing the rupture disk of FIG. 4 in the ruptured position.

Catcher bar 60 provides a more secure retaining means for the central section 58 of concave-convex portion 14, which allows the central section 58 to wrap itself around catcher bar 60 as shown in FIG. 8. Where rupture disk 12 reverses and ruptures the central section 58 of concave-convex portion 14 bends catcher bar 60 up to the position shown in FIG. 8. This deformation of catcher bar 60 absorbs some of the kinetic energy of the central section 58 and aids in preventing hinge portion 56 from tearing and allowing central section 58 to be blown downstream.

Figure 9:
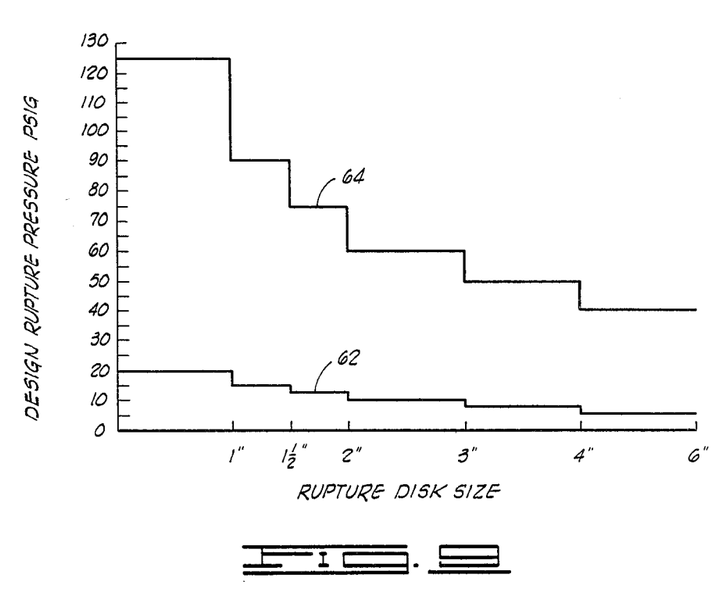
FIG. 9 is a graph illustrating the minimum design rupture pressure for various sizes of the apparatus of the present invention and the minimum design rupture pressure for various sizes of heretofore used scored reverse buckling rupture disk assemblies.

Referring now to FIG. 9, a graph is presented illustrating the minimum design rupture pessures for various sizes of the apparatus of the present invention (line 62) and the minimum design rupture pressures for corresponding sizes of heretofore used scored reverse buckling rupture disk assemblies (line 64). The term "minimum design rupture pressure" is used herein to mean the minimum fluid pressures exerted on the reverse buckling rupture disk assemblies whereby the disks will reliably reverse and fully open, and if reversal without rupture takes place due to damage, etc., the disks will rupture at a fluid pressure no greater than 1.5 times the design reversal rupture pressure. While the reverse buckling rupture disk assemblies can be utilized in applications below the minimum rupture pressures indicated in FIG. 9, their reliability is lessened drastically in that the probability of reversal without rupture is increased and the control of the ratio of tension rupture pressure to design reversal rupture pressure is much more difficult. The lines 64 and 62 representing the minimum design rupture pressures for scored reverse buckling rupture disk assemblies and the reverse buckling rupture disk apparatus of the present invention, respectively, are based on experience in actual operation of the apparatus. As shown, the reverse buckling rupture disk apparatus of the present invention can be reliably used in applications wherein the design reversal rupture pressure of the disks is much lower than those achievable by scored reverse buckling rupture disk assemblies. In addition, because of the economical construction of the apparatus of the present invention, i.e., the support member 20 can be formed of sheet metal, when an overpressure condition causes the rupture of the apparatus, it can economically be discarded and replaced with an entire new apparatus. This is contrasted with scored reverse buckling rupture disk assemblies utulized heretofore and prior reverse buckling rupture disk assemblies including knife blades which include special parts and are costly to manufacture. Further, because the support member 20 is spot welded to the rupture disk 12, it stiffens the annular flange portion 16 thereof decreasing the chances of damage to the rupture disk 12 during handling and/or installation.

Thus, the present invention is well adapted to carry out the objects and attain the ends and advantages mentioned as well as those inherent therein. While numerous changes in the construction and arrangement of parts can be made by those skilled in the art, such changes are encompassed within the spirit of this invention as defined by the appended claims.

What is claimed is:

1. A safety pressure relief apparatus comprising:
   a reverse buckling rupture disk including a concave-convex portion connected to an annular flat flange portion by a curved transition connection; and
   a support member having an annular flat flange portion engaging said annular flat flange portion of said rupture disk for supporting said transition connection thereof, said support member including a partially circular cutting edge positioned interiorly of said transition connection and also including a non-cutting interior edge, said cutting and non-cutting interior edges forming an opening in said support member so that when said concave-convex portion of said rupture disk reverses itself, said cutting edge partially severs said disk whereby a partially severed portion of said disk bends about an integral unsevered portion of said disk and passes through said opening in said support member.

2. The apparatus of claim 1 wherein said cutting edge is serrated.

3. The apparatus of claim 2 wherein teeth of said cutting edge are inclined in a direction towards said rupture disk.

4. The apparatus of claim 2 wherein said serrated cutting edge comprises rounded notches between adjacent teeth.

5. The apparatus of claim 4, wherein said rounded notches each comprise an arc of a circle, with arcs of adjacent notches intersecting at a point of one of said teeth.

6. The apparatus of claim 1 wherein said non-cutting edge comprises a chord of said opening.

7. The apparatus of claim 6 wherein said non-cutting edge further comprises an integral channel portion of said support member.

8. The apparatus of claim 7 wherein said channel portion comprises:
   a sloped arcuate side portion;
   a substantially vertical straight side portion intersecting the arcuate side portion; and
   a flat bottom portion connecting said arcuate and straight side portions.

9. The apparatus of claim 1 further comprising a cantilevered catcher bar extending radially inward from said non-cutting edge.

10. The apparatus of claim 9, wherein a portion of said curved transition connection is of substantially greater radius of curvature than the remaining portion thereof, said portion of greater radius of curvature being positioned adjacent said non-cutting interior edge of said support member.

11. The apparatus of claim 1 wherein a portion of said curved transition connection is of substantially greater radius of curvature than the remaining portion thereof.

12. The apparatus of claim 11 wherein said portion of greater radius of curvature of said transition connection is positioned with respect to said non-cutting interior edge such that reversal of said rupture disk begins adjacent said non-cutting edge and proceeds in a direction transverse to said non-cutting edge.

13. The apparatus of claim 12 wherein severance of said rupture disk upon reversal begins at a point on said cutting edge opposite said non-cutting edge and proceeds toward said non-cutting edge, so that said partially severed portion of said rupture disk may blend about said integral portion of said rupture disk adjacent said non-cutting edge and pass through the opening in said support member.

14. The apparatus of claim 13 further comprising a cantilevered catcher bar extending radially inward from said non-cutting edge, substantially parallel to the directions of reversal and severance of said rupture disk.

15. The apparatus of claim 11 wherein said portion of said transition connection of greater radius of curvature has a radius of curvature in the range of from about 1.5 to 2 times greater than the radius of curvature of the remaining portion thereof.

16. The apparatus of claim 15 wherein said portion of said transition connection of greater radius of curvature has a length in the range of about ½ inch to 1½ inches.

17. A safety pressure relief apparatus comprising:
a reverse buckling rupture disk including a concave-convex portion connected to an annular flat flange portion by a curved transition connection; and
a support member having an annular flat flange portion engaging said annular flat range portion of said rupture disk for supporting said transition connection thereof, said support member including a serrated cutting edge and a non-cutting edge positioned interiorly of said transition connection defining an opening in said support member, said serrated cutting edge including rounded notches between adjacent teeth so that the number and length of teeth required to sever said rupture disk are minimized thereby decreasing the force required to sever said disk on reversal and increasing the flow area of said opening.

18. Apparatus of claim 17, wherein said rounded notches each comprise an arc of a circle, with arcs of adjacent notches intersecting at a point of one of said teeth.

19. The apparatus of claim 17 wherein the teeth of said serrated cutting edge are triangular and have a tooth point angle in the range of about 50° to 70°.

20. The apparatus of claim 17 wherein the teeth of said cutting edge are inclined toward and into the concave-convex portion of said rupture disk at an angle in the range of about 30° to 45°.

21. The apparatus of claim 17 wherein a portion of said curved transition connection of said rupture disk is of a substantially greater radius of curvature than the remaining portion thereof so that when said concave-convex portion of said disk reverses itself, such reversal starts at said portion of greater radius of curvature.

22. The apparatus of claim 21 wherein said opening is a partially circular opening and said non-cutting edge comprises a chord of said partially circular opening.

* * * * *

UNITED STATES PATENT AND TRADEMARK OFFICE
CERTIFICATE OF CORRECTION

PATENT NO. : 4,236,648
DATED : December 2, 1980
INVENTOR(S) : Loren E. Wood et al.

It is certified that error appears in the above—identified patent and that said Letters Patent is hereby corrected as shown below:

Column 1, line 14, "of" should read -- or --.

Column 13, line 23, "blend" should read -- bend --.

Signed and Sealed this

Third Day of March 1981

[SEAL]

Attest:

RENE D. TEGTMEYER

Attesting Officer    Acting Commissioner of Patents and Trademarks